J. MAUNTON.
Metallurgic Furnace.
No. 70,873.
Patented Nov. 12, 1867.
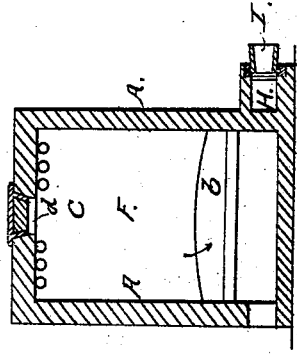
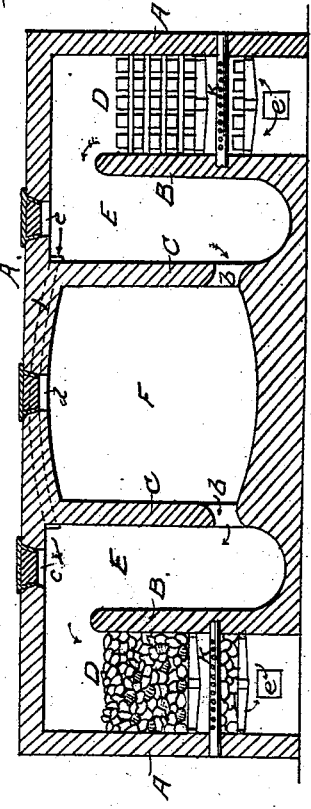
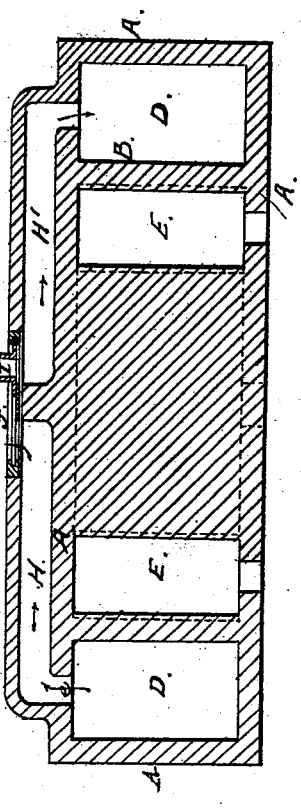
WITNESSES:
INVENTOR:
Jabez Maunton

United States Patent Office.

JABEZ MAUNTON, OF NEW YORK, N. Y., ASSIGNOR TO HIMSELF, WRIGHT DURYEA, WILLIAM ENNIS, J. H. VAN RIPER, A. P. CUMMINGS, AND J. WENDELL COLE, OF THE SAME PLACE.

Letters Patent No. 70,873, dated November 12, 1867.

IMPROVEMENT IN FURNACES FOR DESULPHURIZING AND REDUCING ORES.

The Schedule referred to in these Letters Patent and making part of the same.

TO ALL WHOM IT MAY CONCERN:

Be it known that I, JABEZ MAUNTON, of the city, county, and State of New York, have invented a certain new and useful Improvement in Furnaces, of which the following is a full, clear, and exact description, reference being had to the accompanying drawing, forming part of this specification, and in which—

Figure 1 represents a vertical longitudinal section of a furnace constructed according to my improvement.

Figure 2 a horizontal section through the base portion of the furnace, and

Figure 3 a vertical transverse section, mainly through the centre of the furnace.

Similar letters of reference indicate corresponding parts.

My invention will here be described as applied to the reduction of precious ores, or the separation by heat of the precious metals from quartz; but it is equally applicable to the reduction of ores generally, or other reducing purposes, whether metallurgic or otherwise. In this, as in another of my inventions, the base-burning is combined with a regenerating principle of action, but the construction and mode of working the furnace are different. Economy of fuel and concentration, and, when required, intensity of heat and the saving of the finer or volatilized particles of metal, constitute among others the objects or advantages of my improvement. Though the furnace is here shown as constructed for burning coal, coke, or such other like fuel, various kinds of fuel may be used, including those of a liquid character.

The nature of the invention consists, firstly, in a novel arrangement or combination of fuel or combustion-chambers with an intermediate vertical quartz or reducing-chamber, all connected by a passage or passages below, so that the combustion and reduction are established at or near the base, and the draught or blast made to pass alternately, in opposite directions, through the fuel and reducing-chambers; also, in combination with such an arrangement, the application of separate regenerating-chambers, preferably of a vertical character, and whereby the escape has a downward direction given it, and is arranged in the base of the furnace; likewise, said invention consists in combining with the vertical regenerators, near their base, a water-spray pipe for keeping cool the lower portions of the regenerators, and condensing or causing to be retained the finer or volatilized particles of precious metal passing off from the reducing-chambers.

In the accompanying drawing, A represents the outer walls and roof of the furnace, and B B C C, inner transverse walls or partitions therein, the one set B B of which do not extend fully up to the roof, so as to establish communication between chambers D D and E E. The outer set or pair D D of these chambers constitute regenerators of a vertical character, and containing or made up of any suitable refractory material, while the inner pair or set E E of said chambers form fuel compartments, and are made to communicate with each other and an intermediate quartz, ore, or reducing-chamber, F, by base-passages $b\ b$. The fuel and quartz or ore are or may be supplied these chambers by openings $c\ c$ and $d$ in the roof, covered by suitable stoppers or lids. The regenerators D D connect below in their rear by openings $e$ with back passages H H', that meet in a general branch or opening, $f$, controlled by a blast or inlet-draught regulating-valve, I, which, accordingly as it is moved to the right or left, establishes the current through the correspondingly situated, that is, right or left regenerator, down through the fuel in the chamber E adjacent to it, into and through the reducing-chamber F and among the material at its base contained therein, and up through the fuel in the second chamber E, from whence it passes down through the second regenerator, and out by its opening $e$ below, into the back passage H or H' in communication with the half or portion of the opening $f$ which is out of connection with the blast, and constitutes the escape. By reversing the position of the valve I, so as to turn the current in an opposite direction through the passages H H', of course the draught in or through the furnace will be reversed, which action, as well understood in the working of furnaces on the regenerating principle, is alternated at intervals or repeatedly, as the one regenerator becomes sufficiently heated by the escaping gases or products of combustion, and the opposite one correspondingly cooled by the incoming current of air for the purpose of generating, where required, an intense heat by comparatively a small expenditure of fuel consequent on the utilization within the furnace, through its regenerators, of the escaping products of combustion. But by this my improved construction of furnace there are special advantages. Thus, not only is the sulphur contained within the material or materials in the furnace liberated in a continuous stream by the radiation of heat from the base of the furnace, the sulphurous gases passing alternately through either of the fires with the change of air-current through the furnace, and its combustion perfected by mixture with heated air passing along a pipe or passage or passages, J, but the combustion and reducing process being confined to the base, increased economy is effected, the heat being made more available to its work and the durability of the furnace enhanced, while the fuel-chambers, being alternately recharged, act by the fuel contained in them as regenerators to a certain extent, at least, or apart from separate devices of that character, as described, and the upper portions of the sides of the reducing and fuel-chambers, as well as roof of the furnace, protected from destruction or injury by heat, to which the downward course of the escape through the vertical regenerators D D alternately, and arrangement of the outlets e below, materially assist. Such portion of the finer particles of precious metal as is not freed by the combustion of the sulphur in the manner described, but passes off in a volatilized form, I effect the liberation or condensation of in the regenerators D D, by arranging in the lower strata of the latter spray-water pipes K, which serve to keep the lower portions of the regenerators at a comparatively low temperature, and whereby the minutest particles of mineral will be retained for after-collection from the furnace along with the metal deposited in the other chambers by or through suitable outlets or openings.

What I claim as my invention, and desire to secure by Letters Patent, is—

1. The combination with a reversible draught in or through them, essentially as specified, of the fuel-chambers E E and intermediate reducing-chamber F, said chambers being chargeable from above, and communicating with each other at or near the base, substantially as and for the purpose or purposes specified.

2. The combination, with a reversible draught, operating as described, of regenerators D D, fuel-chambers E E, and intermediate reducing-chamber F, said fuel and reducing-chambers connecting with each other at or near the base, and chargeable from above, essentially as herein set forth.

3. The vertical regenerators D D, with their draught-inlets or outlets e arranged below, in combination with the fuel-chambers E E and intermediate reducing-chamber F for action, as described.

4. In combination with the vertical regenerators, the spray-water pipes K, essentially as and for the purpose specified.

JABEZ MAUNTON.

Witnesses:
   J. W. COOMBS,
   GEO. W. REED.